United States Patent
Katayama et al.

(10) Patent No.: US 12,049,255 B2
(45) Date of Patent: Jul. 30, 2024

(54) LOWER STRUCTURE OF ELECTRIC VEHICLE

(71) Applicant: Mazda Motor Corporation, Hiroshima (JP)

(72) Inventors: Kenji Katayama, Hiroshima (JP); Muneyuki Ohga, Hiroshima (JP); Ryuhei Sumita, Hiroshima (JP); Shuntaro Nakayama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 348 days.

(21) Appl. No.: 17/670,523

(22) Filed: Feb. 14, 2022

(65) Prior Publication Data

US 2022/0306207 A1    Sep. 29, 2022

(30) Foreign Application Priority Data

Mar. 26, 2021    (JP) .................................. 2021-052654

(51) Int. Cl.
*B62D 25/20*    (2006.01)
*B60K 1/04*    (2019.01)
(Continued)

(52) U.S. Cl.
CPC .............. *B62D 21/157* (2013.01); *B60K 1/04* (2013.01); *B62D 25/20* (2013.01);
(Continued)

(58) Field of Classification Search
CPC ...... B62D 21/157; B62D 21/15; B62D 25/20; B62D 25/2036; B62D 25/2009; H01M 50/249; H01M 50/202; H01M 50/242; H01M 50/262; H01M 50/204; H01M 2220/20; B60L 50/66; B60K 1/04; B60K 2001/0438; B60Y 2306/01; B60R 16/03
(Continued)

(56) References Cited

U.S. PATENT DOCUMENTS

| 9,096,117 B2 *  | 8/2015  | Matsuda ................... B60K 6/48 |
| 2013/0026786 A1 * | 1/2013 | Saeki ....................... B60K 1/04 |
|  |  | 296/187.08 |

(Continued)

FOREIGN PATENT DOCUMENTS

JP    H04368229 A    * 12/1992
JP    2004345454 A   * 12/2004    .............. B60K 1/04
(Continued)

OTHER PUBLICATIONS

Shimada et al. (JP 6406275 B2), machine translation (Year: 2018).*
(Continued)

*Primary Examiner* — Amy R Weisberg
*Assistant Examiner* — Wenwei Zhuo
(74) *Attorney, Agent, or Firm* — XSENSUS LLP

(57) ABSTRACT

To simultaneously improve battery capacity and protect a battery during a lateral collision without causing a weight increase, a cost increase, and the like, an electric vehicle includes a battery system arranged below a floor panel and arranged between a tunnel side frame and a floor side frame; and an attachment bracket connecting the battery system to the tunnel side frame and the floor side frame.

12 Claims, 11 Drawing Sheets

(51) Int. Cl.
   *B62D 21/15* (2006.01)
   *H01M 50/249* (2021.01)
(52) U.S. Cl.
   CPC ... *H01M 50/249* (2021.01); *B60K 2001/0438* (2013.01); *H01M 2220/20* (2013.01)
(58) Field of Classification Search
   USPC ............... 296/187.08, 187.12, 193.07, 204; 180/68.5
   See application file for complete search history.

(56) References Cited

U.S. PATENT DOCUMENTS

| | | | | |
|---|---|---|---|---|
| 2014/0027189 | A1* | 1/2014 | Fujii | B60K 1/04 |
| | | | | 180/68.5 |
| 2014/0338997 | A1* | 11/2014 | Okada | B62D 25/2036 |
| | | | | 180/68.5 |
| 2016/0339774 | A1* | 11/2016 | Hayashi | B60K 1/04 |
| 2018/0029459 | A1* | 2/2018 | Okada | B60K 6/28 |
| 2019/0039446 | A1* | 2/2019 | Koike | B60K 1/04 |
| 2020/0168965 | A1* | 5/2020 | Tanaka | H01M 50/249 |
| 2020/0282845 | A1* | 9/2020 | Sawatzki | B60L 50/64 |
| 2021/0061081 | A1* | 3/2021 | Kodama | B60K 1/04 |
| 2021/0300168 | A1* | 9/2021 | Kohara | B60K 13/04 |
| 2022/0081040 | A1* | 3/2022 | Choi | B62D 21/03 |
| 2022/0396138 | A1* | 12/2022 | Lang | B62D 25/20 |
| 2023/0173905 | A1* | 6/2023 | Eberle | B60K 1/04 |
| | | | | 296/187.08 |

FOREIGN PATENT DOCUMENTS

| | | | | |
|---|---|---|---|---|
| JP | 2017-77840 | A | | 4/2017 |
| JP | 2017077840 | A | * | 4/2017 |
| JP | 6406275 | B2 | * | 10/2018 |
| JP | 2021054217 | A | * | 4/2021 | ............... B60K 1/04 |

OTHER PUBLICATIONS

Kadokura (JP H04368229 A), machine translation (Year: 1992).*
Masui et al. (JP 2004345454 A), machine translation (Year: 2004).*

* cited by examiner

FIG. 2
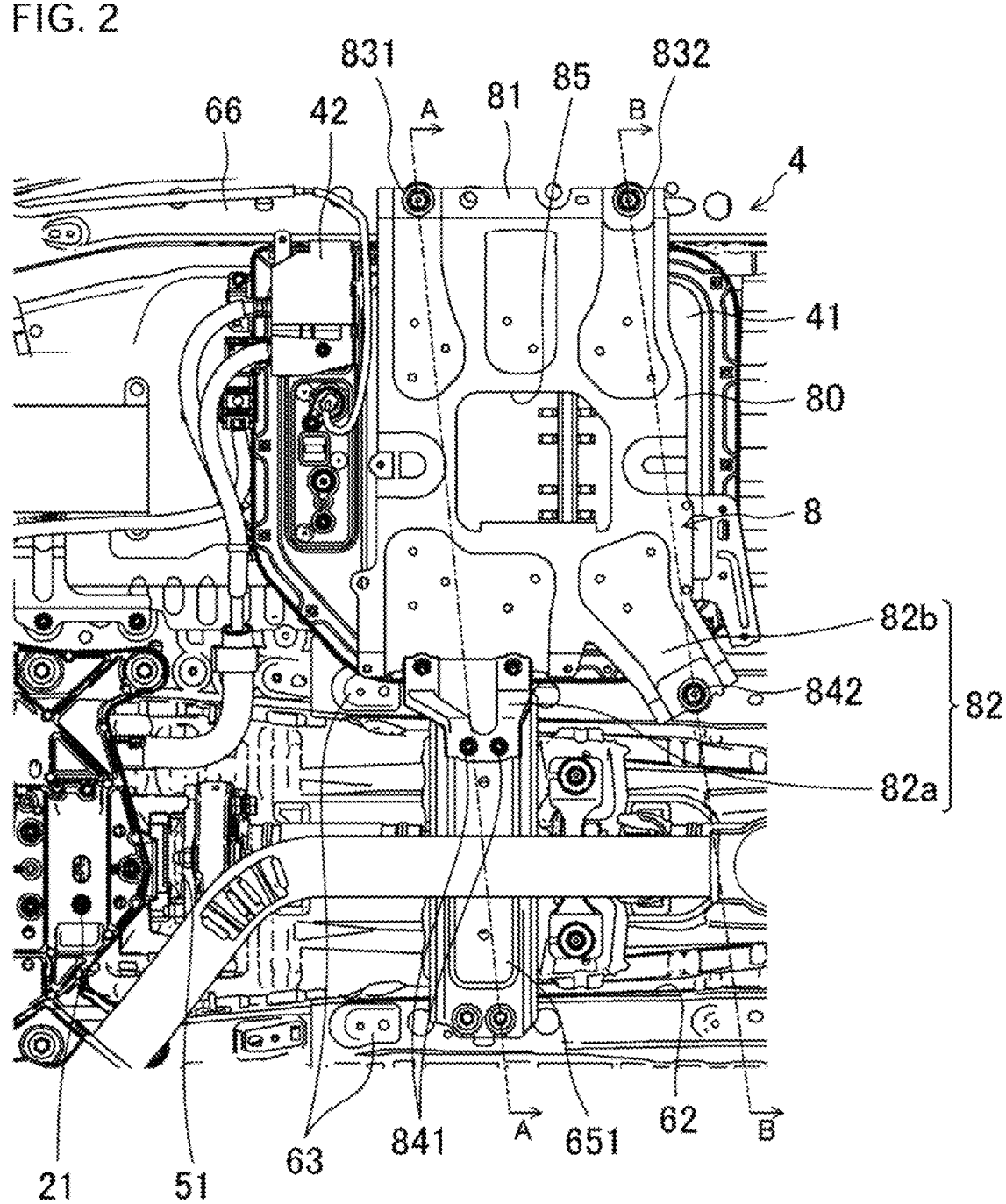
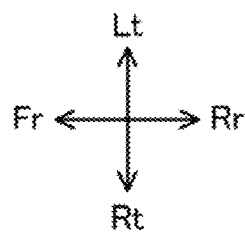

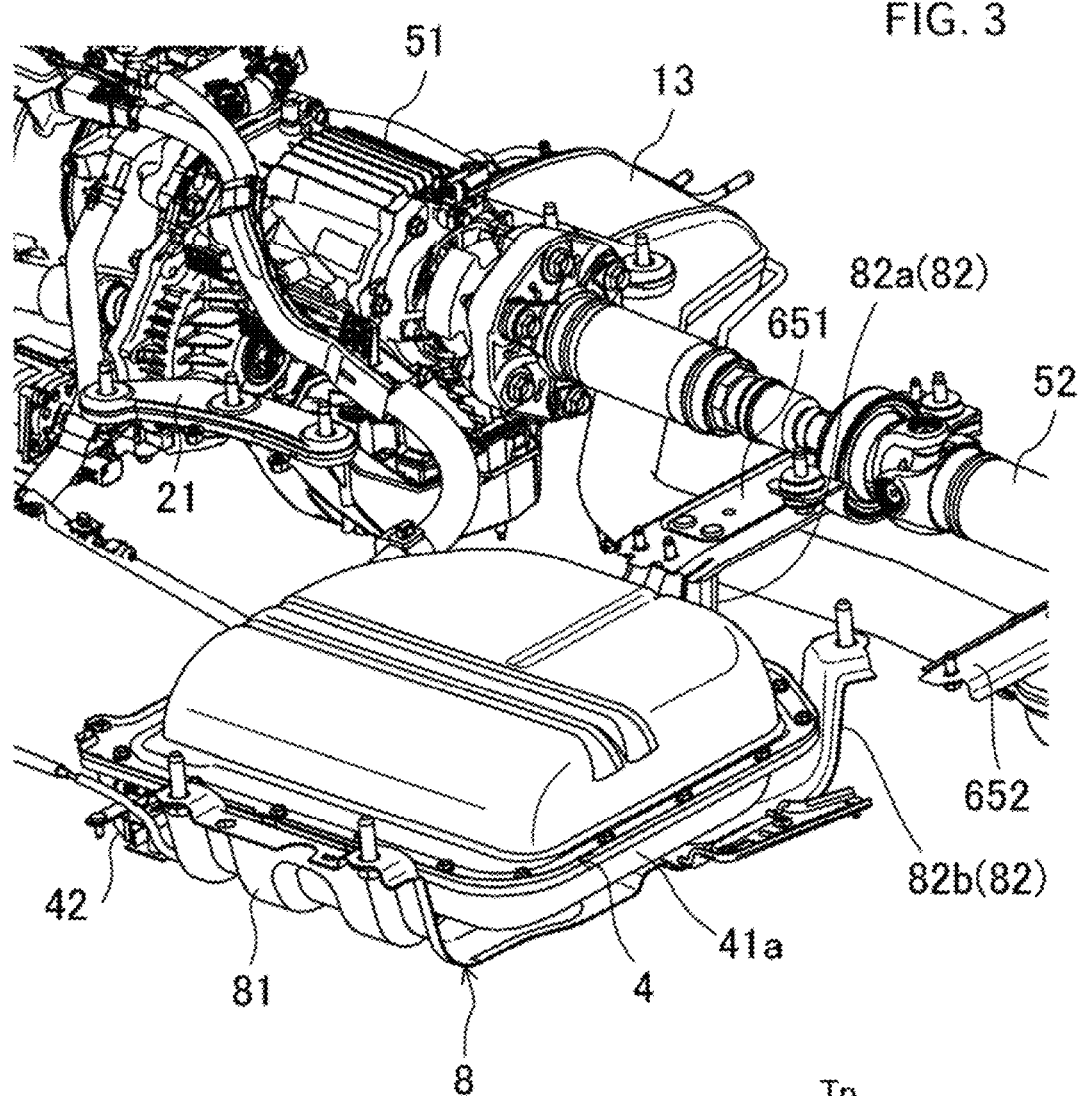
FIG. 3
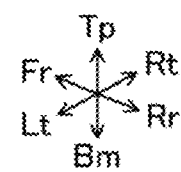

LOWER STRUCTURE OF ELECTRIC VEHICLE

CROSS-REFERENCE TO RELATED APPLICATION

The present application claims priority to Japanese application number 2021-052654 filed in the Japanese Patent Office on Mar. 26, 2021, the entire contents of which is incorporated herein by reference.

TECHNICAL FIELD

A technique disclosed herein relates to a lower structure of an electric vehicle.

BACKGROUND

For example, a typical battery mounting structure for a vehicle (e.g., Patent document 1) includes an attachment bracket that supports a battery from below; a tunnel side frame that is arranged at both of right and left ends of a floor tunnel (a tunnel section); and a floor side frame (a floor frame) that is arranged under a floor panel in the vehicle and is arranged on a vehicle outer side from the tunnel side frame.

The attachment bracket typically is formed to extend from the tunnel side frame to the floor side frame and connects the tunnel side frame and the floor side frame to the battery. In this way, the battery can be disposed under the floor panel.

[Patent document 1] JP-A-2017-77840

SUMMARY

Problems to be Solved

In the case where the vehicle as disclosed in Patent document 1 is used, the floor side frame is arranged on the vehicle outer side and is brought close to a side sill, so as to increase a distance between the tunnel side frame and the floor side frame. The increase in the distance between the tunnel side frame and the floor side frame leads to enlargement of the battery and improvement in battery capacity.

However, in the case where the battery capacity is improved as described above, a side surface (in particular, the side surface facing the vehicle outer side) of the battery is also brought close to the side sill. In the case where the side surface of the battery is brought close to the side sill, it becomes disadvantageous with respect to a lateral collision.

As preparation for the lateral collision, it is considered to provide a hollow energy absorbing member on a side of the battery, for example. However, new provision of the energy absorbing member increases weight, cost, and the like, and thus is inconvenient.

A technique disclosed herein has been made in view of such points and therefore has a purpose of simultaneously improving battery capacity and protecting a battery during a lateral collision without causing a weight increase, a cost increase, and the like.

Solutions to the Problems

A first aspect of the present disclosure relates to a lower structure of an electric vehicle. This electric vehicle includes: a floor panel that is provided with a floor tunnel extending in a vehicle front-rear direction; a tunnel side frame that is arranged below the floor panel in the vehicle and is arranged in both side portions in a vehicle width direction of the floor tunnel; a floor side frame that is arranged below the floor panel in the vehicle and is arranged on an outer side in the vehicle width direction of the tunnel side frame; a battery unit that is arranged below the floor panel in the vehicle and is arranged between the tunnel side frame and the floor side frame in the vehicle width direction; and an attachment bracket that is formed to extend from the tunnel side frame to the floor side frame along the vehicle width direction and connects the battery unit to the tunnel side frame and the floor side frame.

According to the first aspect, the attachment bracket has: a lower wall portion that supports a bottom portion of the battery unit; an outer vertical wall portion that extends upward from an end portion on a vehicle outer side of the lower wall portion and is connected to the floor side frame; and an inner vertical wall portion that extends upward from an end portion on a vehicle inner side of the lower wall portion and is connected to the tunnel side frame. A connected position between the inner vertical wall portion and the tunnel side frame is located higher in the vehicle than a connected position between the outer vertical wall portion and the floor side frame.

Here, the inner vertical wall portion and the tunnel side frame may directly be connected by a fastener such as a bolt or may indirectly be connected via a member such as a tunnel crossmember. The same applies to the outer vertical wall portion and the floor side frame.

According to the first aspect, the connected position between the outer vertical wall portion and the floor side frame is located lower in the vehicle than the connected position between the inner vertical wall portion and the tunnel side frame. In this case, when a load is input from a side of the vehicle, it is possible to set the connected position between the outer vertical wall portion and the floor side frame to be lower than a load input position. Accordingly, when the load is input from the side of the vehicle, the outer vertical wall portion according to the first aspect is more likely to receive the load in a direction toward a vehicle lower side than the inner vertical wall portion. By displacing the outer vertical wall portion toward the vehicle lower side by such a load, the attachment bracket can oscillate like a swing with the connected position between the inner vertical wall portion and the tunnel side frame being a fulcrum. With the oscillation of the attachment bracket, the battery unit, which is supported by the lower wall portion, can also oscillate to the vehicle lower side. By evacuating the battery unit to the vehicle lower side with the oscillation thereof, it is possible to favorably protect the battery unit.

In a point that the battery unit can favorably be protected even when the floor side frame is arranged on the vehicle outer side and brought close to a side sill, in the first aspect, it is possible to simultaneously improve battery capacity and protect a battery during a lateral collision without causing a weight increase, a cost increase, and the like.

According to a second aspect of the present disclosure, a width in the vehicle front-rear direction of the inner vertical wall portion may be shorter than a width in the vehicle front-rear direction of the outer vertical wall portion.

According to the second aspect, since the width of the inner vertical wall portion is reduced, it is possible to promote the oscillation of the attachment bracket with the connected position between the inner vertical wall portion and the tunnel side frame being the fulcrum. This is useful for protection of the battery.

According to a third aspect of the present disclosure, the inner vertical wall portion may have: a first inner vertical wall portion that is connected to the tunnel side frame; and a second inner vertical wall portion that is arranged in line with the first inner vertical wall portion in the vehicle front-rear direction and is connected to the tunnel side frame. A total length as a sum of a width in the vehicle front-rear direction of the first inner vertical wall portion and a width in the vehicle front-rear direction of the second inner vertical wall portion may be shorter than the width in the vehicle front-rear direction of the outer vertical wall portion.

According to the third aspect, since the inner vertical wall portion is constructed of the first and second inner vertical wall portions, it is possible to connect the attachment bracket to the tunnel side frame at least at two positions that are mutually separated in the front-rear direction. In this way, it is possible to stabilize the connection between the inner vertical wall portion and the tunnel side frame. Furthermore, according to the third aspect, a clearance is formed between the first inner vertical wall portion and the second inner vertical wall portion. Accordingly, the width of the entire inner vertical wall portion can easily be set to be short, which is advantageous for promotion of the oscillation of the attachment bracket.

According to a fourth aspect of the present disclosure, the tunnel side frame may have: a first vertical wall portion that faces a vehicle inner side of the floor tunnel and is inclined inward in the vehicle to the vehicle upper side; and a second vertical wall portion that faces a vehicle outer side of the floor tunnel and is inclined outward in the vehicle to the vehicle upper side. The second vertical wall portion may be provided to face a corner on the vehicle inner side in an upper end portion of the battery unit along the vehicle width direction, and may be formed to be inclined with respect to a vehicle up-down direction more steeply than the first vertical wall portion.

In the case where the oscillation of the attachment bracket progresses, the corner on the vehicle inner side of the battery unit possibly comes into contact with the second vertical wall portion. In view of the above, the second vertical wall portion is relatively steeply inclined as in the fourth aspect. As a result, compared to a configuration that the second vertical wall portion extends in parallel with the vehicle up-down direction, for example, it is possible to smoothly guide the corner, which has contacted the second vertical wall portion, to the vehicle lower side. This is advantageous for the protection of the battery unit.

According to a fifth aspect of the present disclosure, the electric vehicle includes a floor crossmember that is arranged on the floor panel and is disposed to extend across both side portions in the vehicle width direction of the floor panel. A vulnerable portion may be formed in a vehicle lower side of the floor crossmember, and the vulnerable portion may be configured to promote bending of the floor crossmember to the vehicle upper side when a load is input from a side of the vehicle.

According to the fifth aspect, when the load is input from the side of the vehicle, the floor crossmember can protrude toward the vehicle upper side. While the battery unit oscillates to the vehicle lower side by the attachment bracket, the floor crossmember protrudes upward in the vehicle. In this way, it is possible to suppress interference between the floor crossmember and the battery unit. This is advantageous for the favorable protection of the battery unit.

According to a sixth aspect of the present disclosure, the vulnerable portion may be arranged on the vehicle outer side from the tunnel side frame in the vehicle width direction, an empty space may be formed between the upper end portion of the battery unit and a lower surface of the floor panel by notching a corner on the vehicle outer side in the upper end portion of the battery unit, and pipes, each of which extends in the vehicle front-rear direction, may be arranged on the vehicle outer side of the empty space.

According to the sixth aspect, in addition to the oscillation of the battery unit to the vehicle lower side and the upward protrusion of the floor crossmember in the vehicle, the empty space according to the sixth aspect is provided. Thus, it is possible to favorably suppress both of interference between the pipes and the upper surface of the battery unit and interference between the pipes and the floor crossmember. In addition, since the corner of the battery unit is notched to provide the empty space, the pipes can easily be guided to the vehicle upper side at the time when an upper surface around the corner and the pipes come into contact with each other.

As it has been described so far, according to the present disclosure, it is possible to improve the battery capacity and protect the battery during the lateral collision without causing the weight increase, the cost increase, and the like.

BRIEF DESCRIPTION OF THE DRAWINGS

FIG. 2 is a bottom view exemplifying a lower structure around a battery unit.

FIG. 3 is a perspective view exemplifying the lower structure around the battery unit.

DETAILED DESCRIPTION

A description will hereinafter be made with reference to the drawings. The one of more aspects of the present disclosure, which will be described below, are illustrative.

Figure 1:
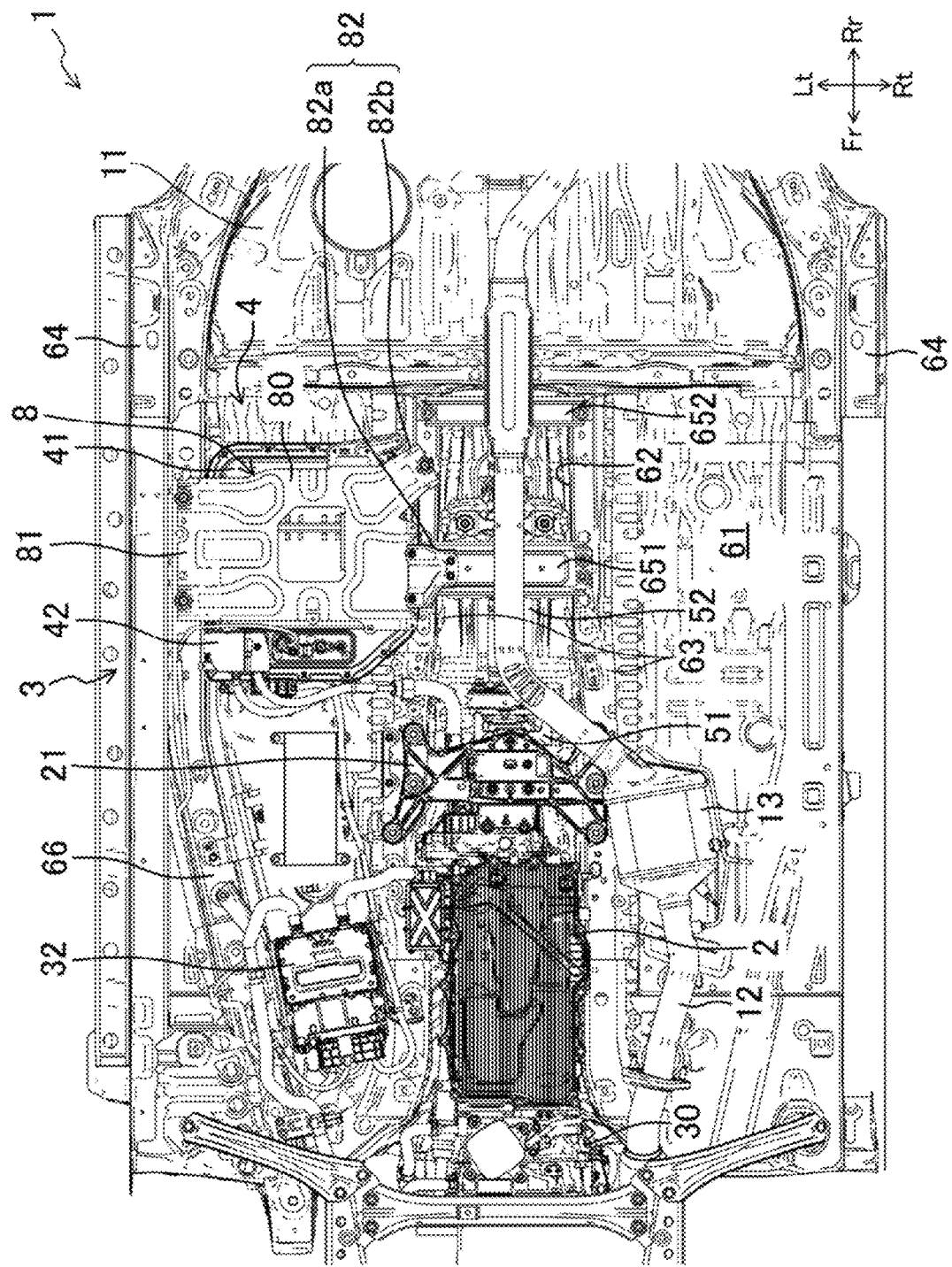
FIG. 1 is a bottom view exemplifying a lower structure of an electric vehicle.
Figure 4:
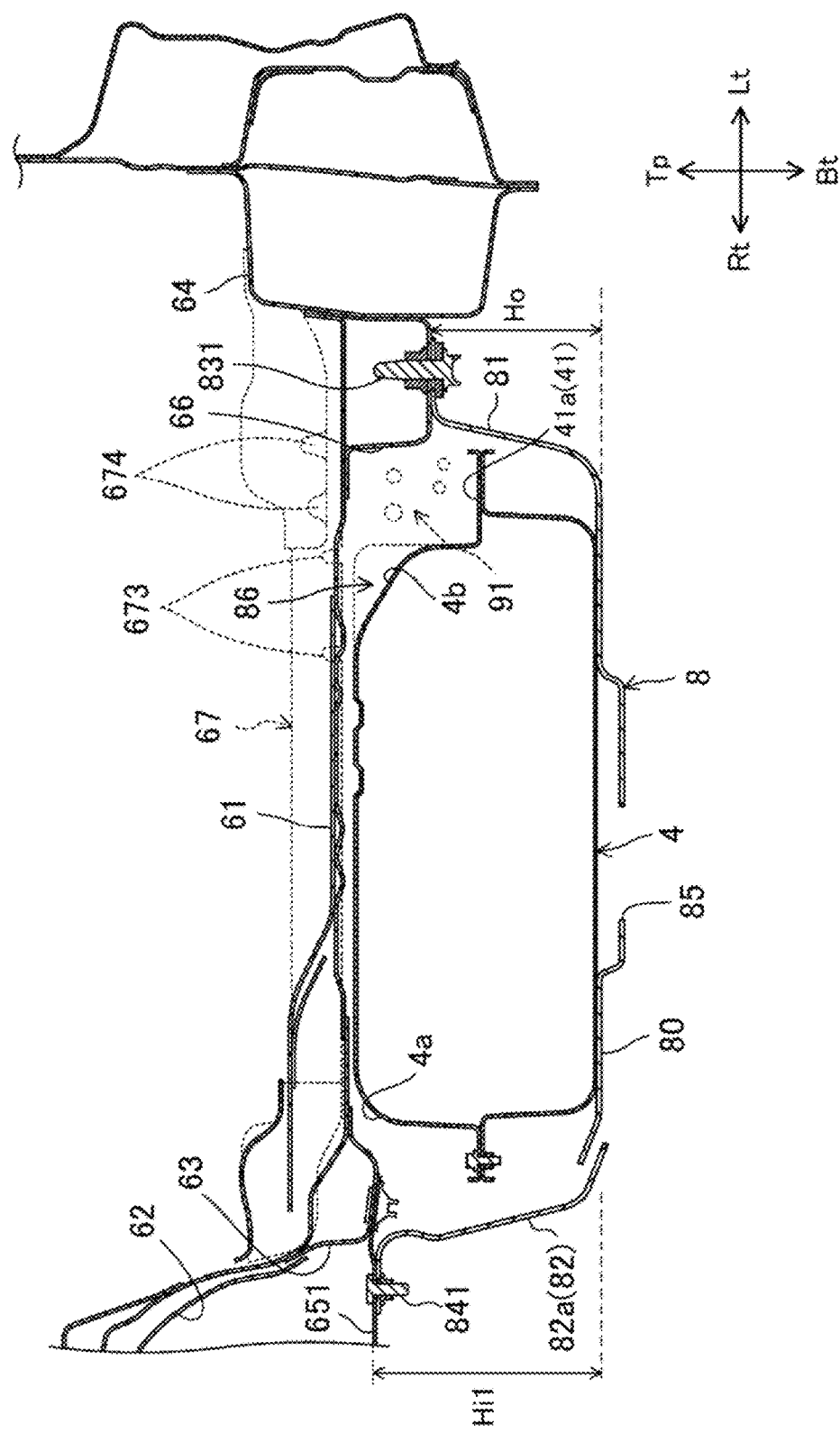
FIG. 4 is a cross-sectional view that is taken along A-A in FIG. 2.
Figure 5:
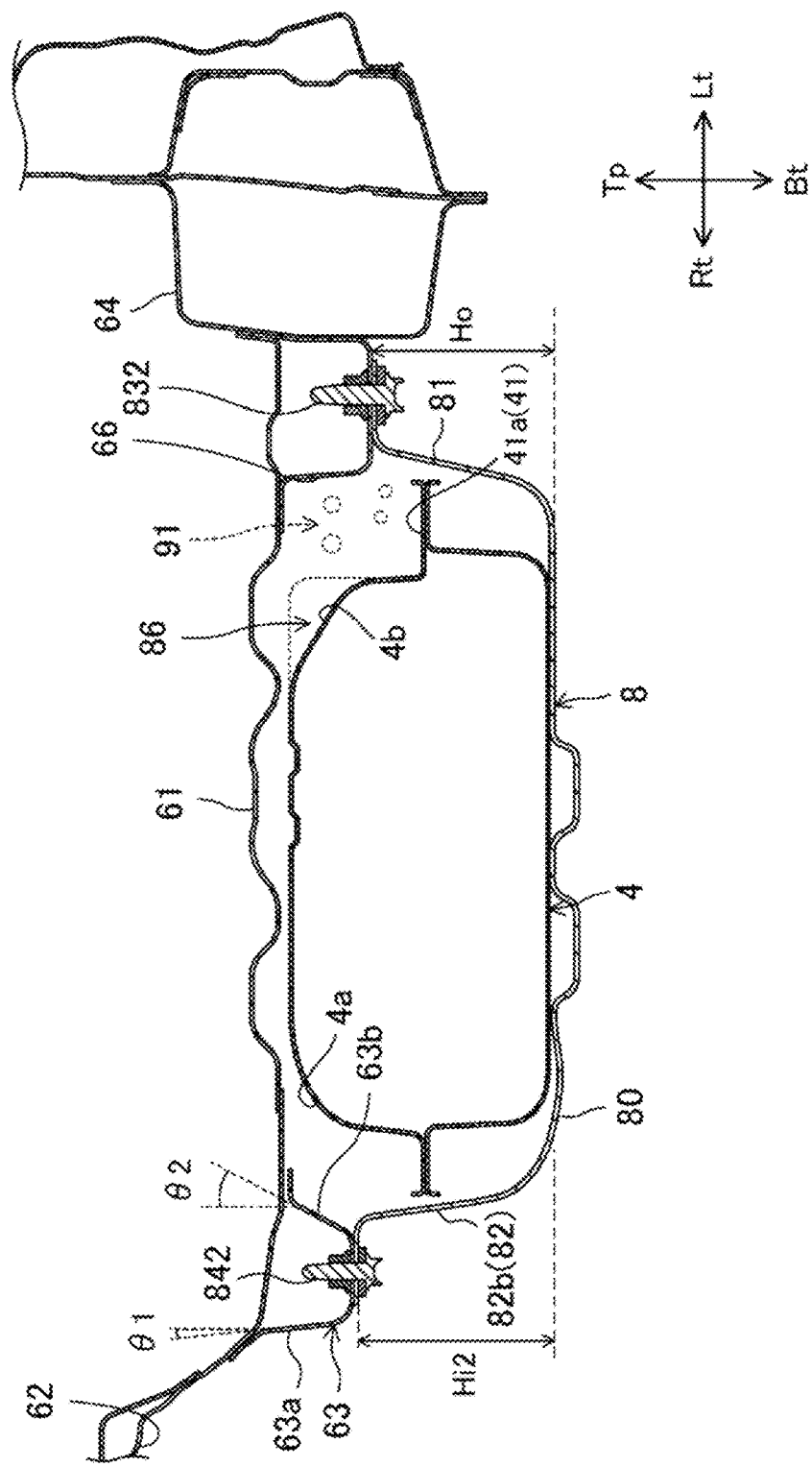
FIG. 5 is a cross-sectional view that is taken along B-B in FIG. 2.

FIG. 1 is a bottom view exemplifying a lower structure of an electric vehicle 1 according to the present disclosure. FIG. 2 is a bottom view exemplifying a lower structure around a battery unit 4, and FIG. 3 is a perspective view exemplifying the lower structure around the battery unit 4. In detail, FIG. 2 is an enlarged view of an arrangement position of the battery unit 4 in FIG. 1, and FIG. 3 is a perspective view in which the lower structure of the electric vehicle 1 is seen obliquely downward from the above in a state where a floor panel 61 is removed. FIG. 4 is a cross-sectional view that is taken along A-A in FIG. 2, and FIG. 5 is a cross-sectional view that is taken along B-B in FIG. 2. In detail, FIG. 4 illustrates a transverse section passing through a first outer fastener 831 and a first inner fastener 841, which will be described below, and FIG. 5 illustrates a transverse section passing through a second outer fastener 832 and a second inner fastener 842, which will be described below.

Terms "front", "rear", "up", and "down" in the following description are defined with reference to the electric vehicle 1. That is, in the following description, "front" refers to "front" in a vehicle front-rear direction that is a front-rear direction of the electric vehicle 1, and "rear" refers to "rear" in the vehicle front-rear direction. Similarly, "up" refers to "up" in a vehicle height direction that is a height direction of the electric vehicle 1, and "down" refers to "down" in the vehicle height direction. In the following description, the vehicle front-rear direction may simply be referred to as the "front-rear direction", and the vehicle height direction may be referred to as an "up-down direction".

Furthermore, upward (an upper side) in the vehicle height direction may be referred to as "upward in the vehicle (a vehicle upper side)" or simply "upward (the upper side)," downward (a lower side) in the vehicle height direction may be referred to as "downward in the vehicle (a vehicle lower side)" or simply "downward (the lower side)," front (a front side) in the vehicle front-rear direction may be referred to as "front in the vehicle (a vehicle front side)" or simply "front (the front side)", and rearward (a rear side) in the vehicle front-rear direction may be referred to as "rearward in the vehicle (a vehicle rear side)" or simply "rear (the rear side)".

Terms "left" and "right" in the following description are also defined with reference to the electric vehicle 1. That is, in the following description, "left" refers to a left side in a vehicle width direction at the time when the electric vehicle 1 is seen from the rear side toward the front side, and "right" refers to a right side at the time when the vehicle is seen from the rear side toward the front side. The vehicle width direction may be referred to as the "right-left" direction.

Furthermore, of directions along the vehicle width direction, a direction away from a central portion of the electric vehicle 1 (more specifically, a central portion of a floor tunnel 62 in the vehicle width direction) may be referred to as "outward in the vehicle (a vehicle outer side)" or simply "outside (an outer side)", and a direction that approaches the central portion of the electric vehicle 1 (the central portion of the floor tunnel 62 in the vehicle width direction) may be referred to as "inward in the vehicle (a vehicle inner side)" or simply "inward (an inner side)".

(Overall Configuration)

The electric vehicle 1 exemplified in FIG. 1 includes: elements associated with a body of the electric vehicle 1 such as the floor panel 61 and the floor tunnel 62; and elements associated with power of the electric vehicle 1 such as an electric drive system 3 and the battery unit 4.

—Elements Associated with Body—

First, as the elements associated with the body, the electric vehicle 1 includes the floor panel 61, the floor tunnel 62, a tunnel side frame 63, a side sill 64, tunnel crossmembers 651, 652, a floor side frame 66, and a floor crossmember 67.

The floor panel 61 is disposed in a lower portion of the electric vehicle 1. The floor panel 61 constitutes a cabin floor of the electric vehicle 1. The floor panel 61 expands in the front-rear direction and the vehicle width direction in a manner to connect the two side sills 64 that are disposed in both side portions in the vehicle width direction of the electric vehicle 1.

The floor panel 61 is provided with the floor tunnel 62 that extends in the vehicle front-rear direction. This floor tunnel 62 is provided in a central portion in the vehicle width direction of the floor panel 61.

In detail, the floor tunnel 62 according to one or more aspects of the present disclosure constitutes an accommodation space for an exhaust pipe 12 and a propeller shaft 52. The floor tunnel 62 bulges above the floor panel 61 as illustrated in FIG. 4 or FIG. 5, and extends in the front-rear direction as illustrated in FIG. 1.

A right and left pair of the tunnel side frames 63 is respectively disposed in both side portions in the vehicle width direction of the floor tunnel 62. Each of the tunnel side frames 63 is arranged below the floor panel 61. Each of the tunnel side frames 63 is a highly rigid frame and extends in the front-rear direction along the floor tunnel 62. In addition, as illustrated in FIG. 4 or FIG. 5, each of the tunnel side frames 63 is formed to have a substantially hat-shaped cross section, an opening of which faces upward, and is joined to a lower surface of respective one of the both of the side portions in the vehicle width direction of the floor tunnel 62.

In detail, as illustrated in FIG. 4, each of the tunnel side frames 63 has a first vertical wall portion 63a and a second vertical wall portion 63b. As will be described below, the first tunnel crossmember 651 and an attachment bracket 8 can be connected to a lower wall portion that connects the first vertical wall portion 63a and the second vertical wall portion 63b in the tunnel side frame 63.

The first vertical wall portion 63a faces a vehicle inner side of the floor tunnel 62. The first vertical wall portion 63a is inclined inward in the vehicle to the vehicle upper side. Meanwhile, the second vertical wall portion 63b faces a vehicle outer side of the floor tunnel 62. The second vertical wall portion 63b is inclined outward in the vehicle to the vehicle upper side.

Here, the second vertical wall portion 63b is formed to be inclined more steeply than the first vertical wall portion 63a with respect to a vehicle up-down direction. In detail, in the case where, of inclination angles that are defined by the vehicle height direction and an inclination direction of the first vertical wall portion 63a, an acute inclination angle is set as a first inclination angle $\theta 1$ and, of inclination angles that are defined by the vehicle height direction and an inclination direction of the second vertical wall portion 63b, an acute inclination angle is set as a second inclination angle $\theta 2$, the second inclination angle $\theta 2$ is set to be larger than the first inclination angle $\theta 1$ ($\theta 2 > \theta 1$). That is, the substantially hat-shaped cross section of the tunnel side frame 63 is bilaterally asymmetrical.

The tunnel crossmembers 651, 652 are attached to specified positions in the floor tunnel 62, more specifically, two positions in a rear portion of the floor tunnel 62. Of the two tunnel crossmembers 651, 652, the first tunnel crossmember 651 on a front side is connected to the tunnel side frame 63 and extends in the vehicle width direction in a manner to connect the two tunnel side frames 63 (partially illustrated in FIG. 4). The first tunnel crossmember 651 is located behind a transmission support member 21, which will be described below.

Of the two tunnel crossmembers 651, 652, the second tunnel crossmember 652 on a rear side also extends in the vehicle width direction in the manner to connect the two tunnel side frames 63. The first tunnel crossmember 651 has a greater width in the front-rear direction than the second tunnel crossmember 652.

The floor side frame 66 is arranged below the floor panel 61 in the vehicle and is arranged on the outer side in the vehicle width direction of the tunnel side frame 63. The floor side frame 66 is arranged on the inner side in the vehicle width direction of the side sill 64. Accordingly, the floor side frame 66 is disposed between the side sill 64 and the tunnel side frame 63.

The floor side frame 66 is a highly rigid frame. In addition, as illustrated in FIG. 4 or FIG. 5, the floor side frame 66 is formed to have a substantially hat-shaped cross section, an opening of which faces upward, and is joined to a lower surface of each of both side portions in the vehicle width direction of the floor panel 61.

In a front end portion of the floor panel 61, the floor side frame 66 is located in the middle between the side sill and the tunnel side frame 63 in the vehicle width direction.

From the above position, the floor side frame 66 extends obliquely outward in the vehicle width direction to the rear of the electric vehicle 1, and abuts an inner side of the side sill 64 at a position near a central portion in the front-rear direction of the floor panel 61. The floor side frame 66 that abuts the inner side of the side sill 64 extends straight toward the rear of the electric vehicle 1 along the inner side of the side sill 64. As exemplified in FIG. 4 and FIG. 5, the floor side frame 66, which abuts the inner side of the side sill 64, is located closer to the side sill 64 than the tunnel side frame 63 in the vehicle width direction.

Although FIG. 4 and the like only illustrate the floor side frame 66 on a left side of the floor tunnel 62, the floor side frame 66 is also disposed on a right side of the floor tunnel 62. The two floor side frames 66 are disposed in a bilaterally-symmetrical manner.

The floor crossmember 67 is disposed on the floor panel 61. In addition, the floor crossmember 67 is disposed to extend across both of the side portions in the vehicle width direction of the floor panel 61 with the floor tunnel 62 being interposed therebetween.

More specifically, the floor crossmember 67 according to one aspect of the present disclosure extends in the vehicle width direction in a manner to connect the side sill 64 provided on the left side of the electric vehicle 1 and the side sill 64 provided on the right side of the electric vehicle 1 with the floor tunnel 62 being interposed therebetween. The floor crossmember 67 constitutes a closed cross section that extends in the vehicle width direction, and can support right and left seats that are disposed in a front side of the cabin.

Figure 8:
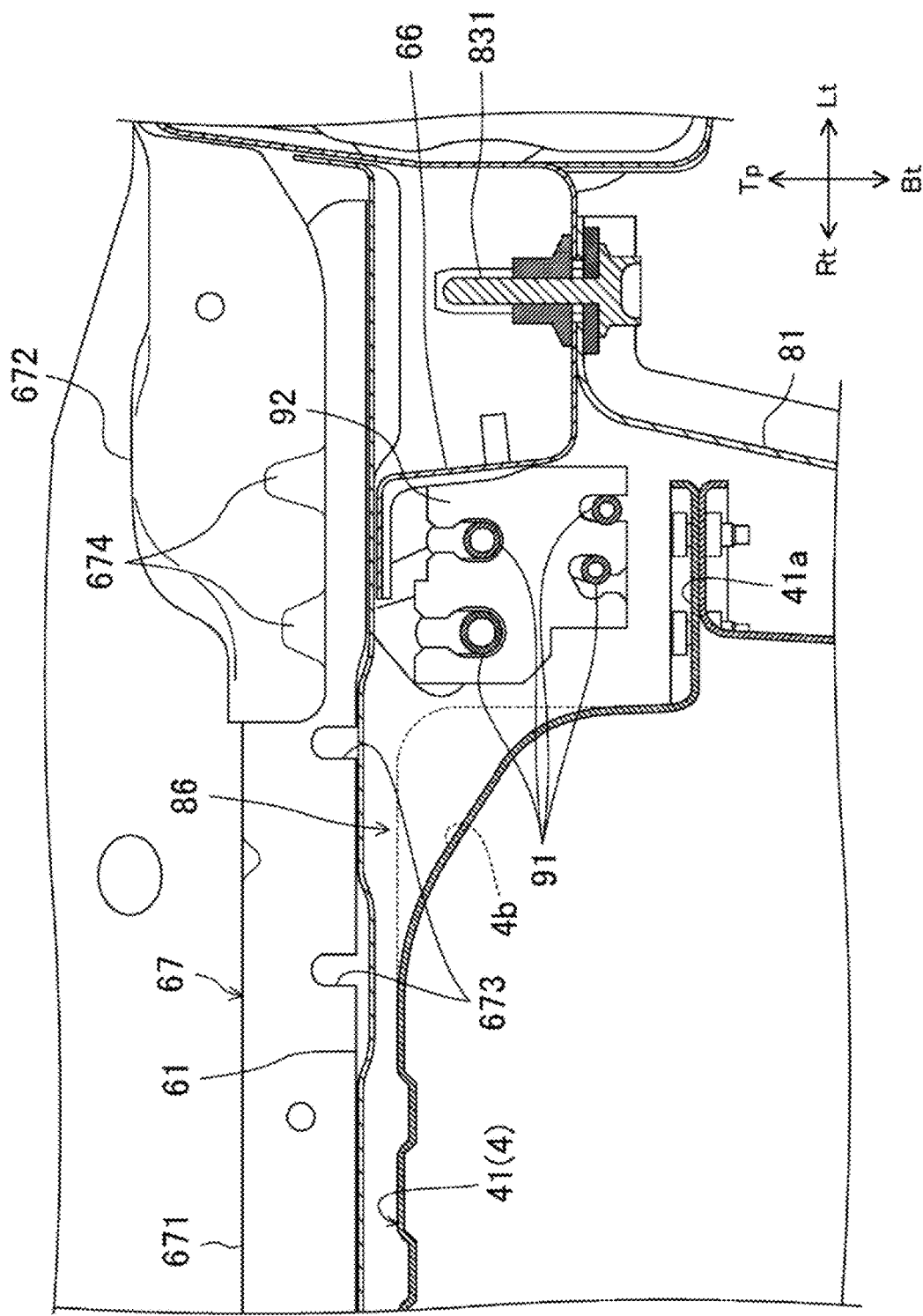
FIG. 8 is a view exemplifying a structure around a floor crossmember.

Here, as exemplified in FIG. 8, the floor crossmember 67 has a hollow first component 671 that extends in the vehicle width direction and a second component 672 that is provided in each of right and left end portions (the left end portion in the illustrated example) of the first component 671. The second component 672 is arranged right above the floor side frame 66 along the vehicle height direction.

In addition, two vulnerable portions 673, 674 are formed in a vehicle lower side of the floor crossmember 67, and the two vulnerable portions 673, 674 are configured to promote bending of the floor crossmember 67 to the vehicle upper side when a load is input from a side of the electric vehicle 1 (an outer side of the electric vehicle 1). Both of the two vulnerable portions 673, 674 are arranged to be closer to the floor side frame 66 than the tunnel side frame 63 in the vehicle width direction.

In detail, as exemplified in FIG. 8, of the two vulnerable portions 673, 674, the first vulnerable portion 673 that is formed in the first component 671 is disposed near a corner (a corner on the vehicle outer side) 4b on the floor side frame 66-side of the battery unit 4. Of the two vulnerable portions 673, 674, the second vulnerable portion 674 that is formed in the second component 672 is disposed near the floor side frame 66 that is disposed on the vehicle outer side of the battery unit 4.

Compared to a portion on the vehicle upper side in the floor crossmember 67, both of the first vulnerable portion 673 and the second vulnerable portion 674 are formed to promote deformation of a portion on the vehicle lower side therein. In the case where the first vulnerable portion 673 and the second vulnerable portion 674 are formed just as described, at the time when the load is input from the side of the electric vehicle 1, the portions (in particular, portions provided with the first vulnerable portion 673 and the second vulnerable portion 674) on the vehicle lower side in the floor crossmember 67 are deformed in a manner to approach each other in the vehicle width direction. This deformation corresponds to deformation that shrinks and crushes each of the first vulnerable portion 673 and the second vulnerable portion 674 in the vehicle width direction. By inducing such deformation, not only bending with the first vulnerable portion 673 or the second vulnerable portion 674 as an origin occurs, but also such bending deformation can occur that the bending protrudes upward in the vehicle.

In detail, the first vulnerable portion 673 includes a notch that is provided in a lower half portion of the first component 671 in the floor crossmember 67. By providing the notch, it is possible to promote the deformation that crushes and shrinks the lower half portion of the first component 671. Meanwhile, the second vulnerable portion 674 has a bead shape that is provided in a lower half portion of the second component 672 in the floor crossmember 67. By providing the bead shape, it is possible to promote the deformation that crushes and shrinks the lower half portion of the second component 672.

—Elements Associated with Power—

Next, as the elements associated with the power, the electric vehicle 1 includes, as elements associated with a power transmission system, an engine, which is not illustrated, a transmission 2, and the electric drive system 3. The electric vehicle 1 is a four-wheel-drive vehicle that is based on a front-engine, rear-wheel-drive vehicle. The electric vehicle 1 further includes a transfer 51 and the propeller shaft 52 as the elements associated with the power transmission system.

The engine is a gasoline engine that is supplied with fuel at least containing gasoline, or a diesel engine that is supplied with diesel fuel. The engine is of a spark-ignition type or a compression-ignition type. However, a type of the engine is not particularly limited. The engine is installed in a so-called vertically-arranged manner in an engine compartment that is provided in a front portion of the electric vehicle 1. A fuel tank 11 is disposed in a rear portion of the electric vehicle 1. The fuel tank 11 stores the fuel to be supplied to the engine.

The exhaust pipe 12 for discharging exhaust gas is connected to the engine. The exhaust pipe 12 is disposed under the floor panel 61 that constitutes the cabin floor of the electric vehicle 1. The exhaust pipe 12 extends from the engine compartment towards the rear of the electric vehicle 1. In detail, the exhaust pipe 12, on the right side of the floor tunnel 62, extends from the engine compartment toward the rear of the electric vehicle 1, is bent to a center side in the vehicle width direction, and further extends toward the rear of the electric vehicle 1 along the floor tunnel 62. A catalytic converter 13 is disposed in the middle of the exhaust pipe 12.

The electric drive system 3 includes an electric motor 30, an inverter, and the battery unit 4. The electric motor is disposed on an output shaft of the engine. The electric motor 30 is interposed between the engine and the transmission 2. The electric motor 30 outputs drive torque for travel of the vehicle during power running, and also performs regeneration to apply a braking force to the vehicle.

For example, the transmission 2 is an automatic transmission that includes at least one planetary gear mechanism. However, the transmission 2 is not limited to the automatic transmission. The transmission 2 is joined to the output shafts of the engine and the electric motor 30. The transmission 2 changes and outputs the torque of the engine and/or the electric motor 30.

The transmission 2 is disposed behind the electric motor 30. As illustrated in FIG. 1 and FIG. 2, the electric motor 30 and the transmission 2 are disposed on the inside of the floor tunnel 62. In a front portion of the floor tunnel 62, a case of the transmission 2 extends in the front-rear direction along the floor tunnel 62.

The transfer 51 is connected to an output shaft of the transmission 2. The transfer 51 is disposed on the inside of the floor tunnel 62. A case of the transfer 51 is integrated with the case of the transmission 2. Hereinafter, the case of the transfer 51 and the case of the transmission 2, which are integrated, will collectively be referred to as the "case of the transmission 2".

A rear end portion of the case of the transmission 2, more precisely, the case of the transfer 51 is supported by the transmission support member 21. The transmission support member 21 extends in the vehicle width direction in a manner to stretch between the two tunnel side frames 63.

The propeller shaft 52 is connected to the transfer 51. The transfer 51 distributes the torque of the engine and/or the electric motor 30 to front wheels and rear wheels.

On the inside of the floor tunnel 62, the propeller shaft 52 extends from the transfer 51 to the rear of the electric vehicle 1. The propeller shaft 52 is connected to a rear driveshaft, which is joined to the right and left rear wheels, via a rear differential gear, which is not illustrated.

The battery unit 4 is electrically connected to the electric motor 30 via the inverter. The battery unit 4 supplies electric power for driving the electric motor 30 thereto. In addition, the battery unit 4 is charged during the regeneration of the electric motor 30. The inverter supplies the electric power of the battery unit 4 to the electric motor 30 during the power running, and transmits the electric power generated by the electric motor 30 to the battery unit 4 during the regeneration.

Figure 6:
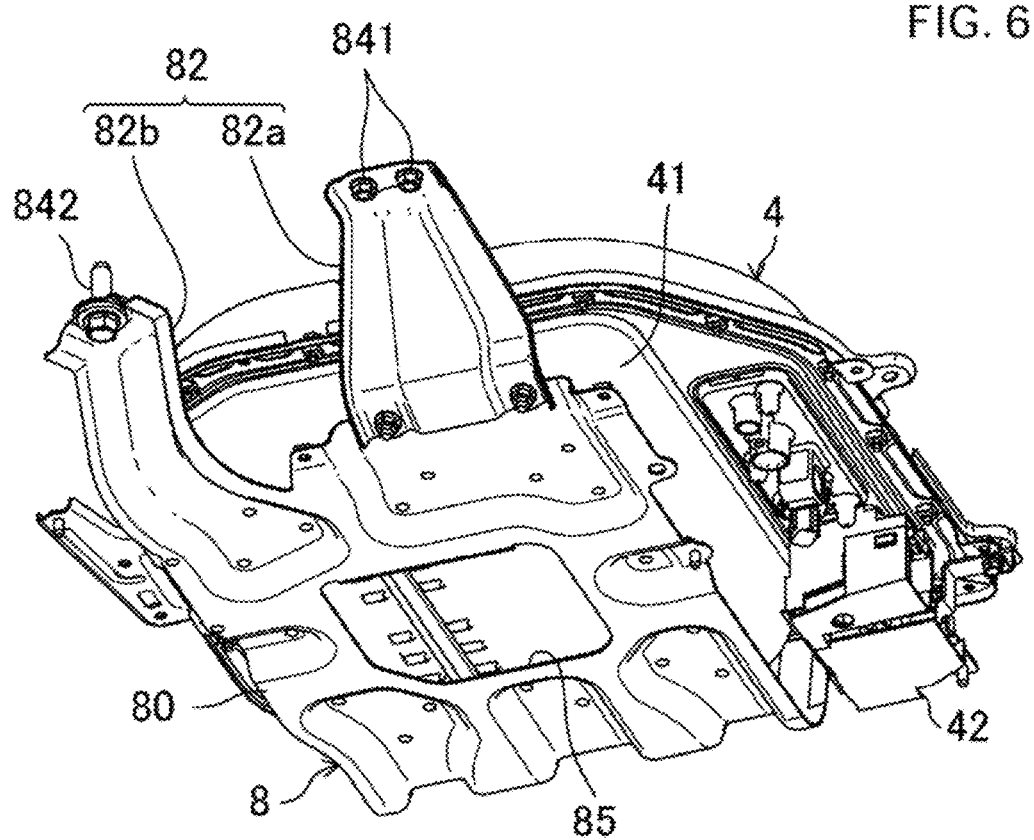
FIG. 6 is a perspective view exemplifying the battery unit and an attachment bracket that are seen from a vehicle inner side.
Figure 7:
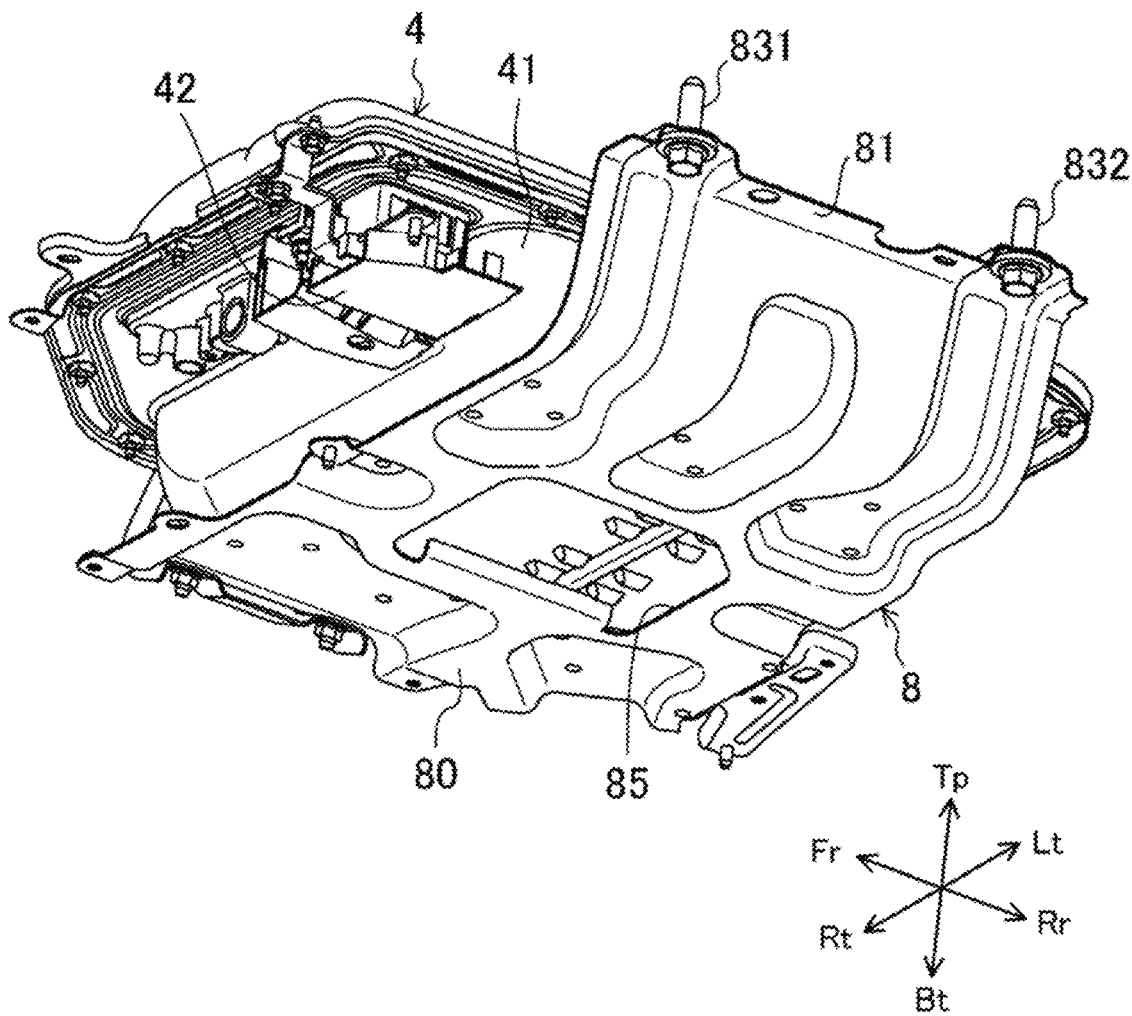
FIG. 7 is a perspective view exemplifying the battery unit and the attachment bracket that are seen from a vehicle outer side.

As exemplified in FIG. 1 or FIG. 2, the battery unit 4 has a substantially rectangular shape in a bottom view. The battery unit 4 has a battery module 41 and a junction box 42. As also illustrated in FIG. 6 or FIG. 7, the junction box 42 is disposed in a front end portion of the battery unit 4. The battery module 41 is disposed behind the junction box 42.

The battery unit 4 is arranged under the floor panel 61 in the vehicle. In addition, the battery unit 4 is arranged between the tunnel side frame 63 and the floor side frame 66 in the vehicle width direction.

In detail, under the floor panel 61, the battery unit according to one aspect of the present disclosure is disposed on the left side of the floor tunnel 62. Further in detail, at a position behind the transmission 2 and in front of the fuel tank 11, the battery unit 4 is disposed between the tunnel side frame 63 and the floor side frame 66. The battery unit 4 is disposed on an opposite side of the floor tunnel 62 from the exhaust pipe 12 and the catalytic converter 13 of the engine. This disposition structure allows the electric drive system 3 to be located away from a heat source. A DC/DC converter 32 illustrated in FIG. 1 or FIG. 2 constitutes a part of the electric drive system 3. On the left side of the floor tunnel 62, the DC/DC converter 32 is disposed on the left side of the transmission 2 and in front of the battery unit 4.

As described above, from the central portion to a rear portion in the front-rear direction of the floor panel 61, the floor side frame 66 is disposed to abut the side sill 64. Accordingly, in the rear portion of the floor panel 61, a distance in the vehicle width direction between the tunnel side frame 63 and the floor side frame 66 is long. The large-sized battery unit 4 can be disposed in this large space. Thus, capacity of the battery unit 4 is relatively large.

The electric vehicle 1 also includes the attachment bracket 8 for connecting the battery unit 4 to the body. The battery unit 4 is attached to the floor panel 61 by this attachment bracket 8.

A description will hereinafter be made on a configuration of the attachment bracket 8 together with details of the battery unit 4.

(Configuration of Attachment Bracket)

Figure 10:
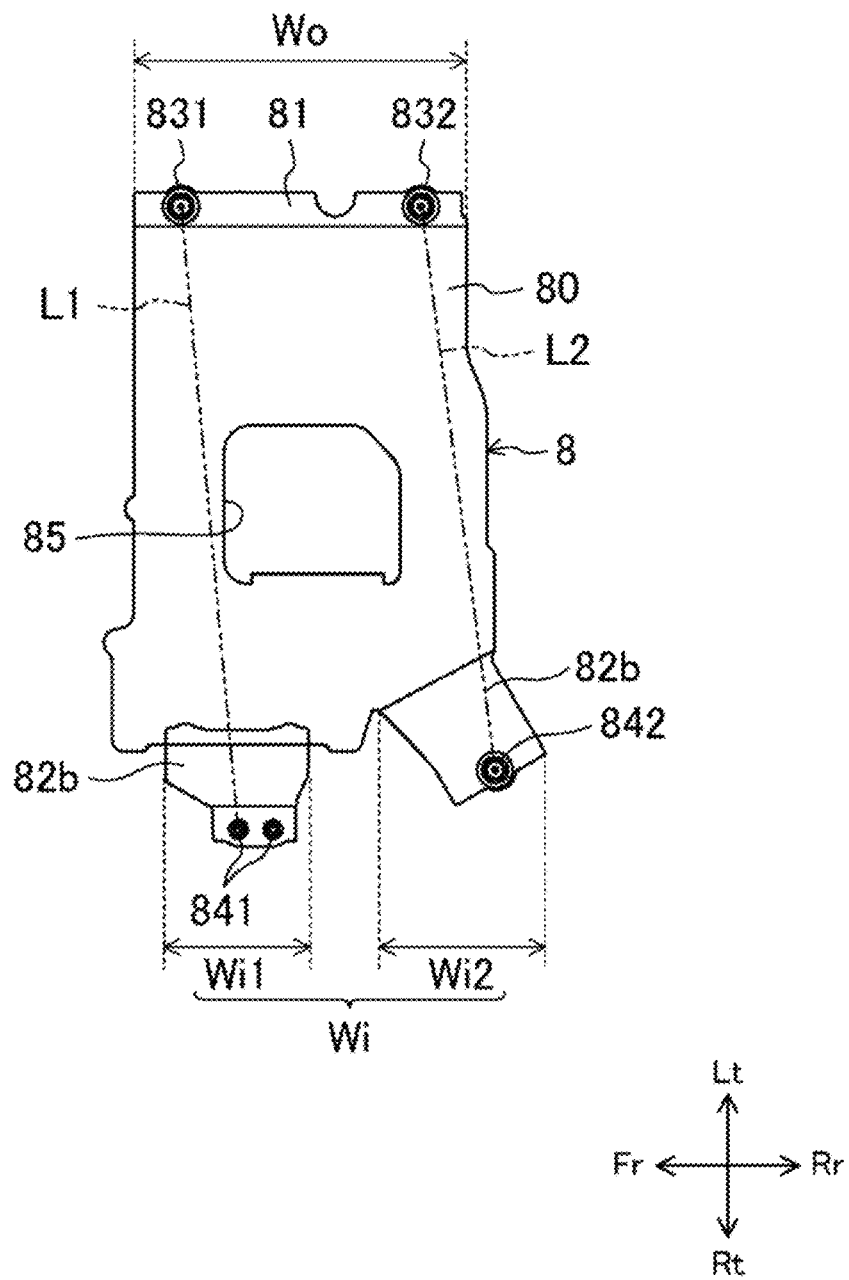
FIG. 10 is a view for explaining a width of the attachment bracket.

FIG. 6 is a perspective view exemplifying the battery unit 4 and the attachment bracket 8 that are seen from the vehicle inner side, and FIG. 7 is a perspective view exemplifying the battery unit 4 and the attachment bracket 8 that are seen from the vehicle outer side. FIG. 8 is a view exemplifying a structure of the floor crossmember 67. FIG. 10 is a view for explaining a width of the attachment bracket 8.

As illustrated in FIG. 4 and FIG. 5, the attachment bracket 8 is formed to extend from the tunnel side frame 63 to the floor side frame 66 along the vehicle width direction. The attachment bracket 8 can connect the battery unit 4 to the tunnel side frame 63 and the floor side frame 66. The battery unit 4 is attached to the floor panel 61 via the tunnel side frame 63 and the floor side frame 66.

More specifically, the attachment bracket 8 according to one aspect has a hat-shaped transverse section, an opening of which faces upward. As illustrated in FIG. 6 and FIG. 7, the attachment bracket 8 has a lower wall portion 80, an outer vertical wall portion 81, an inner vertical wall portion 82, outer fasteners 831, 832, and inner fasteners 841, 842.

As illustrated in FIG. 6 or FIG. 7, the lower wall portion 80 supports a bottom portion of the battery unit 4. In detail, this lower wall portion 80 is formed in a rectangular shape that extends along the vehicle front-rear direction and the vehicle width direction and, when seen in a cross section along the vehicle width direction (a cross section that is perpendicular to the vehicle front-rear direction), extends from a position near the tunnel side frame 63 to a position near the floor side frame 66. The lower wall portion 80 is located under the battery unit 4 and expands in a manner to cover a bottom surface of the battery unit 4. The lower wall portion 80 supports the battery unit 4 from below.

In addition, an opening 85 that is formed in a rectangular shape is provided in a central portion of the lower wall portion 80. This opening 85 contributes to a reduction in weight of the lower wall portion 80, and thus the attachment bracket 8.

The outer vertical wall portion 81 extends upward from an end portion (a left end portion in the illustrated example) on the vehicle outer side of the lower wall portion 80 and is connected to the floor side frame 66. In detail, the outer vertical wall portion 81 is located on the outer side (that is, the left side) in the vehicle width direction of the lower wall portion 80 and continues from a left edge of the lower wall portion 80. On the left side of the battery unit 4, the outer vertical wall portion 81 expands in the front-rear direction and extends in the up-down direction.

An upper end portion of the outer vertical wall portion 81 is bent in a flange shape that protrudes outward in the vehicle width direction. While the first outer fastener 831 is inserted in a front portion of the upper end portion, a second outer fastener 832 is inserted in a rear portion of the upper end portion. The first outer fastener 831 and the second outer fastener 832 are inserted in the upper end portion of the outer vertical wall portion 81 from below, and are each fastened to the floor side frame 66. Due to such fastening, the outer vertical wall portion 81 is connected to the floor side frame 66.

The inner vertical wall portion 82 extends upward from an end portion (a right end portion in the illustrated example) on the vehicle inner side of the lower wall portion 80 and is connected to the tunnel side frame 63. In detail, the inner vertical wall portion 82 is located on the inner side (that is, the right side) in the vehicle width direction of the lower wall portion 80 and continues from a right edge of the lower wall portion 80. On the right side of the battery unit 4, the inner vertical wall portion 82 expands in the front-rear direction and extends in the up-down direction. As exemplified in FIG. 10, a width (hereinafter referred to as an "inner width") Wi in the vehicle front-rear direction of the inner vertical wall portion 82 is shorter than a width (hereinafter referred to as an "outer width") Wo in the vehicle front-rear direction of the outer vertical wall portion 81.

Further in detail, the inner vertical wall portion 82 has: a first inner vertical wall portion 82a that is connected to the tunnel side frame 63; and a second inner vertical wall portion 82b that is arranged in line with the first inner vertical wall portion 82a in the vehicle front-rear direction and connected to the tunnel side frame 63.

Here, as exemplified in FIG. 6, the first inner vertical wall portion 82a and the second inner vertical wall portion 82b are configured as mutually independent components and are arranged in line with a space being interposed therebetween in the vehicle front-rear direction. The above-described inner width Wi corresponds to a total length as a sum of a width (hereinafter referred to as a "first inner width") Wi1 in the vehicle front-rear direction of the first inner vertical wall portion 82a and a width (hereinafter referred to as a "second inner width") Wi2 in the vehicle front-rear direction of the second inner vertical wall portion 82b (that is, Wi=Wi1+Wi2).

More specifically, the first inner vertical wall portion 82a is arranged on the vehicle front side when compared to the second inner vertical wall portion 82b. The first inner vertical wall portion 82a is located on the inner side (that is, the right side) in the vehicle width direction of the lower wall portion 80 and continues from a front portion of the right edge of the lower wall portion 80. On the right side of the battery unit 4, the first inner vertical wall portion 82a expands in the front-rear direction and extends in the up-down direction.

In addition, an upper end portion of the first inner vertical wall portion 82a is bent in a flange shape that protrudes outward in the vehicle width direction. A front and rear pair of the first inner fasteners 841 is inserted in the upper end portion thereof. As illustrated in FIG. 4, the first inner fasteners 841 jointly fasten the upper end portion of the first inner vertical wall portion 82a and the first tunnel crossmember 651 (also see FIG. 3). As described above, the first tunnel crossmember 651 is connected to the tunnel side frame 63. Accordingly, due to this joint fastening, the first inner fasteners 841 are connected to the tunnel side frame 63 via the first tunnel crossmember 651.

More specifically, the upper end portion of the first inner vertical wall portion 82a is located on a center side in the vehicle width direction from the tunnel side frame 63. In this way, the first inner vertical wall portion 82a is located at the substantially same position as the tunnel side frame 63 in the vehicle width direction. Since the first inner vertical wall portion 82a is located on the center side in the vehicle width direction, a right portion of the battery unit 4 can be located on the center side in the vehicle width direction, and the right portion of the battery unit 4 is adjacent to the left portion of the floor tunnel 62. That is, the battery unit 4 becomes large in size, and accordingly, the capacity of the battery unit 4 becomes large.

As illustrated in FIG. 10, the attachment bracket 8 is configured that a straight line L1 connecting the first outer fastener 831 and the first inner fastener 841 does not cross the opening 85 provided in the lower wall portion 80.

Meanwhile, the second inner vertical wall portion 82b is arranged on the vehicle rear side when compared to the first inner vertical wall portion 82a. The second inner vertical wall portion 82b is located on the inner side (that is, the right side) in the vehicle width direction of the lower wall portion 80 and continues from a rear portion of the right edge of the lower wall portion 80. On the right side of the battery unit 4, the second inner vertical wall portion 82b expands in the front-rear direction and extends in the up-down direction. A dimension in the vehicle height direction of the second inner vertical wall portion 82b is slightly shorter than a dimension in the vehicle height direction of the first inner vertical wall portion 82a.

In addition, an upper end portion of the second inner vertical wall portion 82b is bent in a flange shape that protrudes outward in the vehicle width direction. A second inner fastener 842 is inserted in the upper end portion thereof. As illustrated in FIG. 5, the second inner fastener 842 jointly fastens the upper end portion of the second inner vertical wall portion 82b and the tunnel side frame 63. Due to this joint fastening, the second inner fastener 842 is connected to the tunnel side frame 63.

As illustrated in FIG. 10, the attachment bracket 8 according to one aspect is configured that a straight line L2 connecting the second outer fastener 832 and the second inner fastener 842 does not cross the opening 85 provided in the lower wall portion 80. In addition, as illustrated in FIG. 10, a connected position between the second inner fastener 842 and the upper end portion of the second inner vertical wall portion 82b is arranged on the vehicle inner side when compared to a connected position between the first inner fasteners 841 and the upper end portion of the first inner vertical wall portion 82a.

In this aspect, a connected position between the inner vertical wall portion 82 and the tunnel side frame 63 is located higher in the vehicle than a connected position between the outer vertical wall portion 81 and the floor side frame 66.

In other words, a heights (hereinafter also referred to as "inner heights") Hi1, Hi2 of the connected positions between the inner vertical wall portion 82 and the tunnel side frame 63 are located higher in the vehicle than a height (hereinafter also referred to as an "outer height") Ho of the connected position between the outer vertical wall portion 81 and the floor side frame 66.

More specifically, in the example illustrated in FIG. 4 or FIG. 5, as the outer height Ho and the inner heights Hi1, Hi2, heights with the lower wall portion 80 as a reference (a height with the lower wall portion 80 as an origin) are illustrated.

As illustrated in FIG. 4 or FIG. 5, of these, the outer height Ho can be a height that is seen in a transverse section passing through the first outer fastener 831 or a transverse section passing through the second outer fastener 832. Since the outer heights Ho that are seen in the two transverse sections are substantially the same as each other, no distinction will be made therebetween in the following description.

Meanwhile, the inner heights Hi1, Hi2 can be the inner height Hi1 that is seen in a transverse section passing through the first inner fasteners 841 as illustrated in FIG. 4, or the inner height Hi2 that is seen in a transverse section passing through the second inner fastener 842 as illustrated in FIG. 5. In the illustrated example, the inner height Hi1 that is seen in the transverse section passing through the first inner fastener 841 and the first outer fastener 831 is slightly higher than the inner height Hi2 that is seen in the transverse section passing through the second inner fastener 842 and the second outer fastener 832 (that is, Hi1>Hi2).

In addition, both of the two inner heights Hi1, Hi2 are configured to be higher than the outer height Ho (that is, Hi1>Ho and Hi2>Ho). In other words, as illustrated in FIG. 4, when seen in the transverse section passing through the first inner fastener 841 and the first outer fastener 831, the inner height Hi1 is higher than the outer height Ho. Similarly, as illustrated in FIG. 5, when seen in the transverse section passing through the second inner fastener 842 and the second outer fastener 832, the inner height Hi2 is higher than the outer height Ho. As a result of such a configuration, the length in the vehicle height direction of the inner vertical wall portion 82 is longer than the length in the vehicle height direction of the outer vertical wall portion 81. In detail, both the first inner vertical wall portion 82a and the second inner vertical wall portion 82b extend upward in the vehicle to be longer than the outer vertical wall portion 81.

Here, the battery unit 4 is accommodated in an accommodation space that is defined by the attachment bracket 8 configured as described above, the second vertical wall portion 63b of the tunnel side frame 63, the floor side frame 66, and the floor panel 61.

At the time, as illustrated in FIG. 5, the second vertical wall portion 63b is provided to face a corner 4a on the vehicle inner side in an upper end portion of the battery unit 4 along the vehicle width direction. Of the connected position between the inner vertical wall portion 82 and the tunnel side frame 63, a height position of the corner 4a on the vehicle inner side is higher than a connected position between the second inner vertical wall portion 82b and the tunnel side frame 63. In addition, the height position of the corner 4a on the vehicle inner side is slightly lower than an upper end portion of the second vertical wall portion 63b.

Meanwhile, the floor side frame 66 is provided to face a corner 4b on the vehicle outer side in the upper end portion of the battery unit 4 along the vehicle width direction. A height position of the corner 4b on the vehicle outer side is higher than the connected position between the outer vertical wall portion 81 and the floor side frame 66. In addition, the height position of the corner 4b on the vehicle outer side is slightly lower than an upper end portion of the floor side frame 66.

Here, as indicated by a broken line in FIG. 5, an empty space 86 is formed between the upper end portion of the battery unit 4 and the lower surface of the floor panel 61 by notching the corner 4b on the vehicle outer side. As illustrated in FIG. 8, the empty space 86 is arranged below the second vulnerable portion 674.

On the vehicle outer side (the left side in the illustrated example) of the empty space 86, pipes 91, each of which extends in the vehicle front-rear direction, are arranged. These pipes 91 are attached to the floor side frame 66 via a bracket 92. Since the corner 4b is notched, an upper surface near the corner 4b is located lower in the vehicle than the pipes 91. For example, the fuel can be distributed through the pipes 91.

In the vehicle height direction, the pipes 91 are arranged between the lower surface of the floor panel 61 and a flange 41a that protrudes outward in the vehicle in the battery unit 4. In the vehicle width direction, the pipes 91 are arranged between the empty space 86 and the floor side frame 66. The pipes 91 are also arranged under the first vulnerable portion 673.

(Regarding Lateral Collision Performance)

As described above, when the floor side frame 66 is arranged on the vehicle outer side to be close to the side sill 64, it is possible to increase the distance between the tunnel side frame 63 and the floor side frame 66. The increase in the distance between the tunnel side frame 63 and the floor side frame 66 leads to enlargement of the battery unit 4 and improvement in the capacity of the battery unit 4.

However, in the case where the capacity of the battery unit 4 is improved as described above, a side surface (in particular, a left surface facing the vehicle outer side) of the battery unit 4 also becomes close to the side sill 64. In the case where the side surface of the battery unit 4 is brought close to the side sill 64, it becomes disadvantageous to a lateral collision.

As preparation for the lateral collision, it is considered to provide a hollow energy absorbing member on the side of the battery unit 4, for example. However, new provision of the energy absorbing member increases weight, cost, and the like, and thus is inconvenient.

Accordingly, in the electric vehicle 1, by devising the shape of the attachment bracket 8, the battery capacity of the battery unit 4 is improved, and the battery unit 4 is protected during a lateral collision without causing the weight increase, the cost increase, and the like. More specifically, the connected position between the inner vertical wall portion 82 and the tunnel side frame 63 is located higher in the vehicle than the connected position between the outer vertical wall portion 81 and the floor side frame 66.

Figure 9:
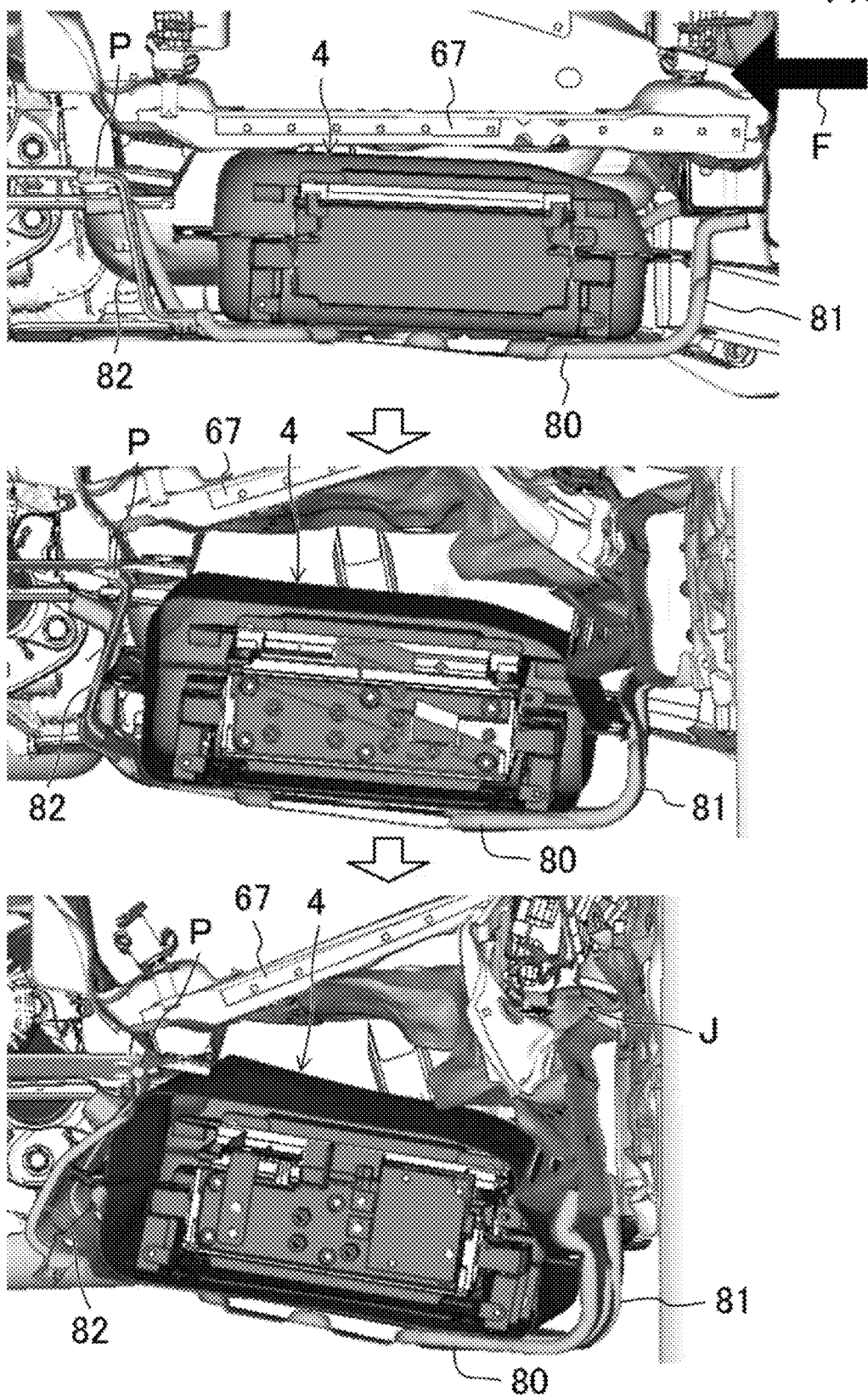
FIG. 9 includes transition views exemplifying oscillation of the battery unit during a lateral collision of the electric vehicle.

FIG. 9 includes transition views exemplifying oscillation of the battery unit 4 during the lateral collision of the electric vehicle 1. Step S1 illustrates a state where the lateral collision occurs and the attachment bracket 8 starts oscillating.

As described above, the connected position between the outer vertical wall portion 81 and the floor side frame 66 is located lower in the vehicle than the connected position between the inner vertical wall portion 82 and the tunnel side frame 63. Accordingly, in the case where the load is input from the side of the electric vehicle 1 (in particular, as indicated by an arrow F, in the case where the load is input from the side to a position above the floor panel 61 in the vehicle), the outer vertical wall portion 81 is more likely to receive the load in a direction toward the vehicle lower side than the inner vertical wall portion 82. By displacing the outer vertical wall portion 81 toward the vehicle lower side by such a load, the attachment bracket 8 can oscillate like a swing with the connected position between the inner vertical wall portion 82 and the tunnel side frame 63 being a fulcrum P.

Step S2 illustrates a state where the oscillation of the attachment bracket 8 has progressed. With the progress of the oscillation of the attachment bracket 8, the battery unit 4, which is supported by the lower wall portion 80 of the attachment bracket 8, can also oscillate to the vehicle lower side. This oscillation causes the battery unit 4 to be inclined obliquely in a manner to displace the portion thereof on the vehicle outer side downward.

When the load is input from the side of the electric vehicle 1, the floor crossmember 67 receives such a load that bends the floor crossmember 67. By providing the vulnerable portions 673, 674 that are configured as described above, the floor crossmember 67 can be bent in the manner to protrude upward in the vehicle. While the battery unit 4 oscillates to the vehicle lower side, the floor crossmember protrudes upward in the vehicle. In this way, as illustrated in step S2, it is possible to suppress interference between the floor crossmember 67 and the battery unit 4. This is advantageous for the favorable protection of the battery unit 4.

Although not illustrated, in step S2, the pipes 91 are displaced toward the vehicle inner side. However, in addition to the oscillation of the battery unit 4 to the vehicle lower side and the upward protrusion of the floor crossmember 67 in the vehicle as described above, the empty space 86 that is configured as described above is provided. Thus, it is possible to favorably suppress both of interference between the pipes 91 and the upper surface of the battery unit 4 and interference between the pipes 91 and the floor crossmember 67. In addition, since the corner 4b of the battery unit 4 is notched to provide the empty space 86, the pipes 91 can easily be guided to the vehicle upper side at the time when an upper surface around this corner 4b and the pipes 91 come into contact with each other.

Step S3 illustrates a state where the oscillation of the attachment bracket 8 has further progressed. With the further progress of the oscillation of the attachment bracket 8, oscillation of the battery unit 4 is also further progressed. As a result, the battery unit 4 can be evacuated to the vehicle lower side. By evacuating the battery unit to the vehicle lower side, it is possible to avoid interference between the battery unit 4 and a vehicle component J, which is formed when the side sill 64 and the like are crushed toward the vehicle inner side, and to favorably protect the battery unit 4.

Just as described, in the point that the battery unit 4 can favorably be protected even when the floor side frame 66 is arranged on the vehicle outer side and brought close to the side sill 64, in this electric vehicle 1, it is possible to simultaneously improve the battery capacity and protect the battery during the lateral collision without causing the weight increase, the cost increase, and the like.

In addition, in the case where the oscillation of the attachment bracket 8 further progresses, the corner 4a on the vehicle inner side of the battery unit 4 possibly comes into contact with the second vertical wall portion 63b. However, since the second vertical wall portion 63b is steeply inclined as described above, compared to a configuration that the second vertical wall portion 63b extends in parallel with the vehicle up-down direction, for example, it is possible to smoothly guide the corner 4a, which has contacted the second vertical wall portion 63b, to the vehicle lower side. This is advantageous for the protection of the battery unit 4.

Furthermore, since it is configured to set the inner width Wi, which is the width in the vehicle front-rear direction of the inner vertical wall portion 82, to be shorter than the outer width Wo, which is the width in the vehicle front-rear direction of the outer vertical wall portion 81, it is possible to promote the oscillation of the attachment bracket 8 with the connected position between the inner vertical wall portion 82 and the tunnel side frame 63 being the fulcrum P.

Moreover, as described above with reference to FIG. 10, since it is configured that the straight lines L1, L2 do not intersect the opening 85, it is possible to suppress the attachment bracket 8 from being deformed by the load that is input along the straight lines L1, L2. In this way, it is possible to simultaneously promote the oscillation of the attachment bracket 8 by reducing the weight thereof and secure rigidity of the attachment bracket 8.

In one aspect, the inner vertical wall portion 82 is constructed of the first inner vertical wall portion 82a and the second inner vertical wall portion 82b. However, the present disclosure is not limited to such a configuration. An inner vertical wall portion 82' may be constructed of a single inner vertical wall portion like an attachment bracket 8' illustrated in FIG. 11. In this case, an inner width Wi' corresponds to a width in the vehicle front-rear direction of the single inner vertical wall portion. When this inner width Wi' is set to be shorter than an outer width Wo' it is possible to promote oscillation of the attachment bracket 8' and thus to favorably protect the battery unit that is supported by a lower wall portion 80' thereof.

Figure 11:
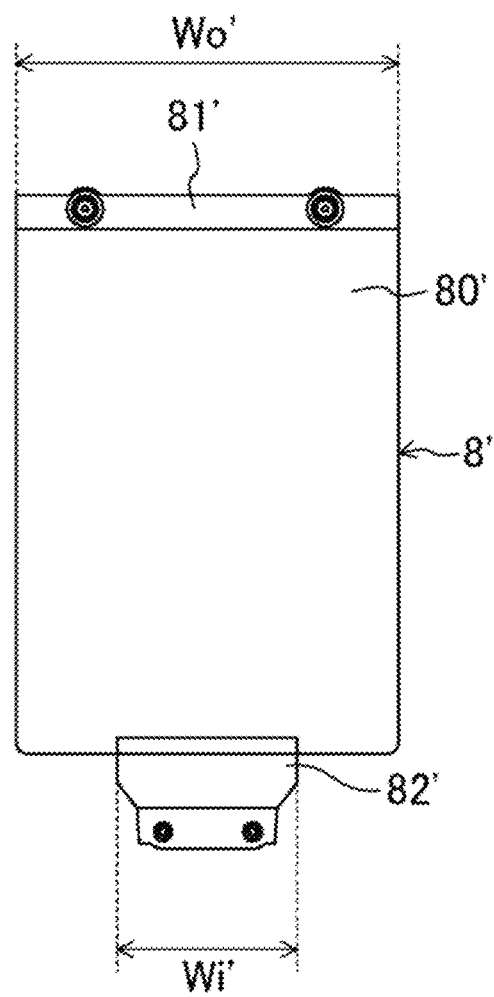
FIG. 11 is a view illustrating a modified example of the attachment bracket.

In an example illustrated in FIG. 11, an outer vertical wall portion 81' is constructed of a single plate-shaped body. However, similar to the inner vertical wall portion 82, the outer vertical wall portion 81' may be constructed of two or more plate-shaped bodies.

The technique disclosed herein is not limited to the application to the four-wheel-drive vehicle. The technique disclosed herein may be applied to the front-engine, rear-wheel-drive vehicle.

What is claimed is:

1. A lower structure of an electric vehicle, comprising:
a floor panel that is provided with a floor tunnel extending in a vehicle front-rear direction;
a tunnel side frame that is arranged below the floor panel in the vehicle and is arranged in both side portions in a vehicle width direction of the floor tunnel;
a floor side frame that is arranged below the floor panel in the vehicle and is arranged on an outer side in the vehicle width direction of the tunnel side frame;
a battery system including a battery and a junction box, wherein the battery system is arranged below the floor panel in the vehicle and is arranged between the tunnel side frame and the floor side frame in the vehicle width direction; and
an attachment bracket that is formed to extend from the tunnel side frame to the floor side frame along the vehicle width direction and connects the battery system to the tunnel side frame and the floor side frame, wherein
the attachment bracket has:
  a lower wall portion that supports a bottom portion of the battery system;
  an outer vertical wall portion that extends upward from an end portion on a vehicle outer side of the lower wall portion and is connected to the floor side frame; and
  an inner vertical wall portion that extends upward from an end portion on a vehicle inner side of the lower wall portion and is connected to the tunnel side frame; and
a connected position between the inner vertical wall portion and the tunnel side frame is located higher in the vehicle than a connected position between the outer vertical wall portion and the floor side frame,
wherein a width in the vehicle front-rear direction of the inner vertical wall portion is shorter than a width in the vehicle front-rear direction of the outer vertical wall portion.

2. The lower structure of the electric vehicle according to claim 1, wherein
the inner vertical wall portion has:
a first inner vertical wall portion that is connected to the tunnel side frame; and
a second inner vertical wall portion that is arranged in line with the first inner vertical wall portion in the vehicle front-rear direction and is connected to the tunnel side frame, and
a total length as a sum of a width in the vehicle front-rear direction of the first inner vertical wall portion and a width in the vehicle front-rear direction of the second inner vertical wall portion is shorter than the width in the vehicle front-rear direction of the outer vertical wall portion.

3. The lower structure of the electric vehicle according to claim 1, wherein
the tunnel side frame has:
a first vertical wall portion that faces a vehicle inner side of the floor tunnel and is inclined inward in the vehicle to the vehicle upper side; and
a second vertical wall portion that faces a vehicle outer side of the floor tunnel and is inclined outward in the vehicle to the vehicle upper side, and
the second vertical wall portion is provided to face a corner on the vehicle inner side in an upper end portion of the battery unit along the vehicle width direction, and is formed to be inclined with respect to a vehicle up-down direction more steeply than the first vertical wall portion.

4. The lower structure of the electric vehicle according to claim 2, wherein
the tunnel side frame has:
a first vertical wall portion that faces a vehicle inner side of the floor tunnel and is inclined inward in the vehicle to the vehicle upper side; and
a second vertical wall portion that faces a vehicle outer side of the floor tunnel and is inclined outward in the vehicle to the vehicle upper side, and
the second vertical wall portion is provided to face a corner on the vehicle inner side in an upper end portion of the battery unit along the vehicle width direction, and is formed to be inclined with respect to a vehicle up-down direction more steeply than the first vertical wall portion.

5. The lower structure of the electric vehicle according to claim 1, further comprising:
a floor crossmember that is arranged on the floor panel and is disposed to extend across both side portions in the vehicle width direction of the floor panel, wherein
a vulnerable portion is formed in a vehicle lower side of the floor crossmember, and the vulnerable portion is configured to promote bending of the floor crossmember to the vehicle upper side when a load is input from a side of the vehicle.

6. The lower structure of the electric vehicle according to claim 2, further comprising:
a floor crossmember that is arranged on the floor panel and is disposed to extend across both side portions in the vehicle width direction of the floor panel, wherein
a vulnerable portion is formed in a vehicle lower side of the floor crossmember, and the vulnerable portion is configured to promote bending of the floor crossmember to the vehicle upper side when a load is input from a side of the vehicle.

7. The lower structure of the electric vehicle according to claim 3, further comprising:
a floor crossmember that is arranged on the floor panel and is disposed to extend across both side portions in the vehicle width direction of the floor panel, wherein
a vulnerable portion is formed in a vehicle lower side of the floor crossmember, and the vulnerable portion is configured to promote bending of the floor crossmember to the vehicle upper side when a load is input from a side of the vehicle.

8. The lower structure of the electric vehicle according to claim 4, further comprising:
a floor crossmember that is arranged on the floor panel and is disposed to extend across both side portions in the vehicle width direction of the floor panel, wherein
a vulnerable portion is formed in a vehicle lower side of the floor crossmember, and the vulnerable portion is configured to promote bending of the floor crossmember to the vehicle upper side when a load is input from a side of the vehicle.

9. The lower structure of the electric vehicle according to claim 5, wherein
the vulnerable portion is arranged on the vehicle outer side from the tunnel side frame in the vehicle width direction,
an empty space is formed between the upper end portion of the battery system and a lower surface of the floor panel by notching a corner on the vehicle outer side in the upper end portion of the battery system, and
pipes, each of which extends in the vehicle front-rear direction, are arranged on the vehicle outer side of the empty space.

10. The lower structure of the electric vehicle according to claim 6, wherein
the vulnerable portion is arranged on the vehicle outer side from the tunnel side frame in the vehicle width direction,
an empty space is formed between the upper end portion of the battery system and a lower surface of the floor panel by notching a corner on the vehicle outer side in the upper end portion of the battery system, and
pipes, each of which extends in the vehicle front-rear direction, are arranged on the vehicle outer side of the empty space.

11. The lower structure of the electric vehicle according to claim 7, wherein
the vulnerable portion is arranged on the vehicle outer side from the tunnel side frame in the vehicle width direction,
an empty space is formed between the upper end portion of the battery system and a lower surface of the floor panel by notching a corner on the vehicle outer side in the upper end portion of the battery system, and
pipes, each of which extends in the vehicle front-rear direction, are arranged on the vehicle outer side of the empty space.

12. The lower structure of the electric vehicle according to claim 8, wherein
the vulnerable portion is arranged on the vehicle outer side from the tunnel side frame in the vehicle width direction,
an empty space is formed between the upper end portion of the battery system and a lower surface of the floor panel by notching a corner on the vehicle outer side in the upper end portion of the battery system, and
pipes, each of which extends in the vehicle front-rear direction, are arranged on the vehicle outer side of the empty space.

* * * * *